(12) United States Patent
Teichmann et al.

(10) Patent No.: US 8,413,678 B2
(45) Date of Patent: Apr. 9, 2013

(54) MECHATRONIC DEVICE

(75) Inventors: Andreas Teichmann, Isernhagen HB (DE); Karl Ahrens, Hannover (DE)

(73) Assignee: WABCO GmbH, Hannover (DE)

( * ) Notice: Subject to any disclaimer, the term of this patent is extended or adjusted under 35 U.S.C. 154(b) by 0 days.

(21) Appl. No.: 11/666,057

(22) PCT Filed: Nov. 3, 2005

(86) PCT No.: PCT/EP2005/011736
§ 371 (c)(1),
(2), (4) Date: Apr. 20, 2007

(87) PCT Pub. No.: WO2006/048269
PCT Pub. Date: May 11, 2006

(65) Prior Publication Data
US 2008/0115844 A1    May 22, 2008

(30) Foreign Application Priority Data

Nov. 4, 2004  (DE) .......................... 10 2004 053 200
Aug. 4, 2005  (DE) .......................... 10 2005 036 663

(51) Int. Cl.
*E03B 7/07*  (2006.01)
(52) U.S. Cl.
USPC ................ 137/557; 137/487.5; 251/129.04
(58) Field of Classification Search ............... 137/487.5, 137/557; 251/129.04
See application file for complete search history.

(56) References Cited

U.S. PATENT DOCUMENTS

| | | | |
|---|---|---|---|
| 4,399,836 A * | 8/1983 | de Versterre et al. ...... | 137/487.5 |
| 4,749,993 A | 6/1988 | Szabo et al. | |
| 4,796,661 A * | 1/1989 | Hishinuma et al. ........ | 137/487.5 |
| 5,535,779 A | 7/1996 | Huang | |
| 5,749,060 A | 5/1998 | Graf et al. | |
| 6,199,575 B1 * | 3/2001 | Widner ......................... | 137/227 |
| 6,435,207 B1 * | 8/2002 | Mewes et al. ............... | 137/487.5 |
| 6,640,645 B2 | 11/2003 | Gröger | |
| 6,681,800 B2 | 1/2004 | Rüdle et al. | |
| 8,758,096 | 7/2004 | Schön et al. | |
| 6,805,146 B2 * | 10/2004 | Albert et al. ............... | 137/15.18 |
| 2003/0019277 A1 | 1/2003 | Brazier et al. | |
| 2003/0186652 A1 | 10/2003 | Hopf et al. | |
| 2004/0011194 A1 | 1/2004 | Lederer et al. | |

FOREIGN PATENT DOCUMENTS

| | | |
|---|---|---|
| DE | 35 03 347 C2 | 8/1986 |
| DE | 41 33 999 C2 | 4/1993 |
| DE | 43 03 591 C2 | 8/1994 |

(Continued)

OTHER PUBLICATIONS

Machine translation of KR100418684 Feb. 2004.*

*Primary Examiner* — Kevin L. Lee
*Assistant Examiner* — Macade Brown
(74) *Attorney, Agent, or Firm* — Kramer Levin Naftalis & Frankel LLP

(57) ABSTRACT

A mechatronic device comprising a housing that encompasses a mechanical part and an electronic part is provided. The mechanical part includes one or more solenoid valves and pressure-directing ducts. The electronic part includes a printed circuit board with electronic components. Sensor modules are incorporated in the pressure-directing ducts to measure physical parameters. In order to minimize electrical connections and separate seals for the sensor modules, the sensor modules wirelessly communicate with at least one reading station located on the circuit board by means of radio technology or light-emitting and light sensitive elements.

16 Claims, 12 Drawing Sheets

FOREIGN PATENT DOCUMENTS

| | | |
|---|---|---|
| DE | 199 17 210 A1 | 10/2000 |
| DE | 199 24 830 A1 | 11/2000 |
| DE | 100 40 238 A1 | 3/2002 |
| DE | 100 44 266 A1 | 4/2002 |
| DE | 100 49 958 A1 | 4/2002 |
| DE | 101 28 447 A1 | 1/2003 |
| DE | 103 01 642 A1 | 7/2004 |
| EP | 1 152 231 A2 | 11/2001 |
| EP | 1 180 602 A1 | 2/2002 |
| KR | 100418684 * | 2/2004 |
| WO | WO 95/10427 | 4/1995 |
| WO | 02/097313 A1 | 12/2002 |

* cited by examiner

MECHATRONIC DEVICE

BACKGROUND OF THE INVENTION

The present invention relates to an improved mechatronic device.

Mechatronic devices of the general type under consideration are known. For Example, EP 1 180 602 A1 describes a control-valve device with an electronics box that contains a printed circuit board for mounting electronic components and permits connection to an external bus. One or more solenoid valves can be plugged into the electronics box and thus brought into electrical contact. Electrical control signals arriving from the bus are processed by the electronic unit and distributed to the associated valves. The control-valve device described in EP 1 180 602 A1 does not have any sensors.

DE 100 49 958 A1 describes a fluidic arrangement as well as a valve array and actuator therefor. The associated actuator is provided with a working cylinder with a piston, the position of which can be detected via displacement sensors or limit switches. The output signals of the sensors can be transmitted optionally by hard-wired or wireless means. In the case of wireless communication, the sensors are configured as transponders.

In mechatronic devices, especially in those with solenoid valves, it is frequently necessary to sense one or more pressures and process them in the associated system electronics, which can be contained in a common housing (see e.g., EP 1 152 231 A2). For this purpose, appropriate pressure sensors are built into these devices. Such pressure sensors must be in sealed communication with an associated pressure duct and fixed in such a way that the pressure force can be detected. Furthermore, an electrical connection, usually of the three-wire type, must be established between the pressure sensor and the system electronics.

This conceals certain reliability risks. For example, temperature fluctuations as well as the elasticity of the sensor fixation in combination with pressure fluctuations can cause movements of the pressure sensor relative to the rest of the mechatronic device or system electronics. As a result, the electrical connections can be subjected mechanically to inadmissible stress. Consequently, contacts can be impaired by corrosive friction, bond connections can break due to fatigue and soldered junctions can also suffer fatigue, resulting in intermittent contact.

Furthermore, the interface to the pneumatic or hydraulic pressure duct can become prone to leaks.

Moreover, such electrical connections can hinder or complicate the manufacturing process because, for example, an additional soldering process is required.

Also, a mechatronic device, especially if it is installed in a motor vehicle, is often exposed to electrical interference due to ambient radio waves. This can adversely affect signal transmission.

The application of wireless transmission technology or radio technology for data transmission is known to those skilled in the art from different practical applications using diverse methods.

One such known method involves transponder technology (the use of transponder technology is increasing and, as a result, it can be expected that the cost of the needed modules—transmitter and receiver—will fall). For example, DE 199 24 830 A1 describes a method of utilizing transponder technology to measure the tire pressure of a vehicle tire without contact with the body. A battery to supply power to the sensor located in the tire is not necessary for this purpose. Transmission can take place when a request signal (oscillation) is sent externally, thus exciting a pressure-dependent oscillation circuit in the sensor, which then rapidly returns a corresponding pressure-dependent analog signal.

Another known method involves BLUETOOTH® technology. The article titled "Bluetooth-frequency energy carriers," Auto & Elektronik January 2002 describes the use of BLUETOOTH™ technology to monitor tire-pressure, wherein both the pressure signals and the energy to supply the pressure sensor are transmitted wirelessly by radio waves.

SUMMARY OF THE INVENTION

Generally speaking, in accordance with the present invention, an improved mechatronic device is provided that overcomes disadvantages associated with conventional devices.

In accordance with the present invention, a mechatronic device is provided that includes a housing encompassing a mechanical part and an electronic part. The mechanical part includes one or more solenoid valves and pressure-conveying ducts; the electronic part includes a printed circuit board with electronic components. In the mechatronic device according to embodiments of the present invention, sensor modules for measuring physical parameters are disposed directly inside the pressure-conveying ducts or in cavities in communication therewith without a special seal and without electrical terminals. Wireless communication over short distances is effected inside the mechatronic housing using radio techniques or light-emitting elements, e.g., light emitting diodes ("LEDs"), increasing operating reliability. As a result, the sensitivity of electrical connection points to length changes caused by temperature fluctuations is eliminated. Furthermore, there is no need for additional soldering for attachment of the sensor modules; nor is there a need for complicated pneumatic or hydraulic seals for the interface between sensors and housing walls. Also, when light-emitting elements are used, sensitivity of the data link to interfering radio waves is eliminated. The use of light for data transmission in accordance with embodiments of the present invention achieves increased transmission reliability because of the elimination of sensitivity of the data link to interfering radio waves. This is particularly advantageous in environments that are prone to radio wave interference, such as, for example, in motor vehicles.

It is thus an object of the present invention to provide for interference-immune communication of sensor signals in a mechatronic device, especially a valve with a built-in electronic unit, including sensors.

Still other objects and advantages of the present invention will in part be obvious and will in part be apparent from the specification.

The present invention accordingly comprises the features of construction, combination of elements, and arrangements of parts which will be exemplified in the constructions hereinafter set forth, and the scope of the invention will be indicated in the claims.

BRIEF DESCRIPTION OF THE DRAWINGS

The present invention will be described in more detail hereinafter on the basis of the accompanying drawings, wherein.

DETAILED DESCRIPTION OF THE PREFERRED EMBODIMENT

Figure 1:
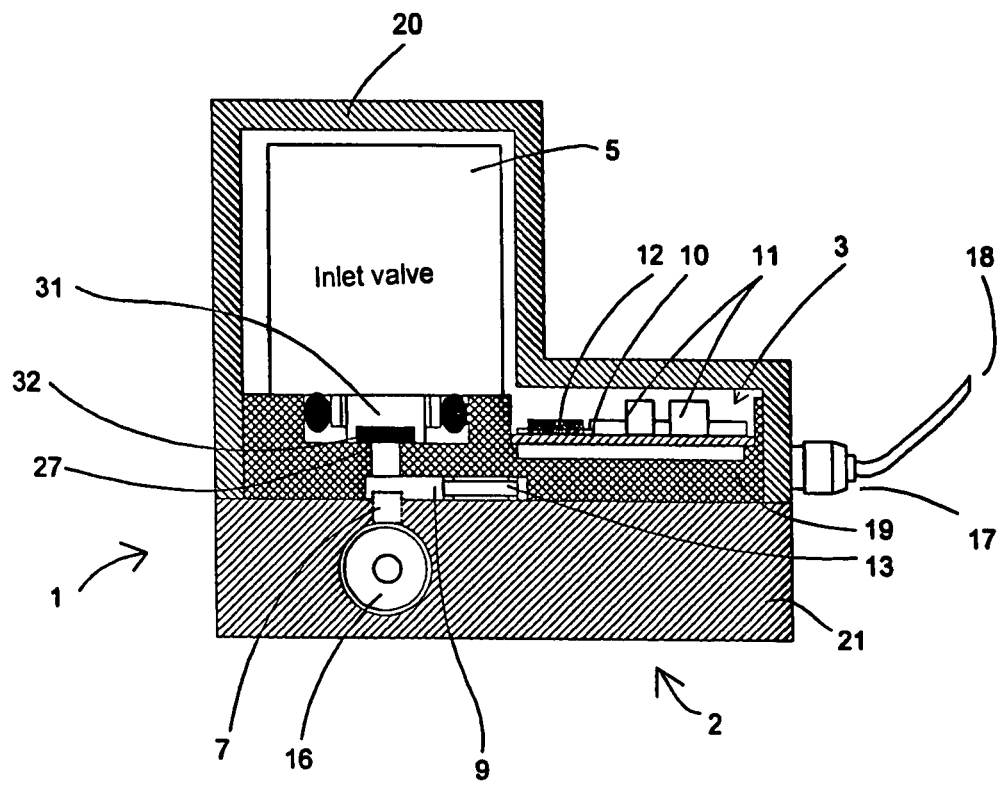
FIG. 1 depicts a mechatronic device with a solenoid valve, an electronic control unit and a sensor module installed in a pressure-conveying duct in accordance with the present invention.

Referring now to the drawings, where like and corresponding components are represented by like reference numerals, FIG. 1 depicts a mechatronic unit according to an embodiment of the present invention, in this case for operation of a valve array, with a housing (1) having a lower part (21) and a cover (20). The mechatronic device further comprises a mechanical part (2) and an electronic part (3).

Electronic part (3) can be disposed inside common cover (20). However, it can also be disposed in a separate electronics housing (26) (see FIG. 6), which is mounted on mechanical part (2).

Under cover (20) there is disposed a solenoid valve pair (5, 6) (see FIG. 3) including an inlet valve (5) and an outlet valve (6). Only the inlet valve (5) is depicted in FIG. 1. A valve-closing element (31) is provided that can close a valve seat (27) by means of a seal (32). As a result, a passage for compressed air or a fluid can be opened and closed.

To provide a valve connection to external pressure lines, at least one pressure port (16) is provided, which is disposed in lower part (21) of housing (1). A pressure-conveying duct (7) is provided to connect pressure port (16) to valve seat (27).

The valve array with associated pressure-conveying ducts can be used to raise, lower or hold a pressure in a vessel, for example. Pressure-conveying ducts (7, 8, 9) can have different cross-sectional shapes, for example, round or rectangular cross sections.

As shown in FIG. 1, a sensor module (13) is disposed in pressure-conveying duct (9) (or it can be disposed in a cavity in communication therewith). Sensor module (13) includes a pressure sensor (29) and a transponder (30) (see FIG. 5). Sensor module (13) is fixed by suitable means inside pressure-conveying duct (9).

Figure 9:
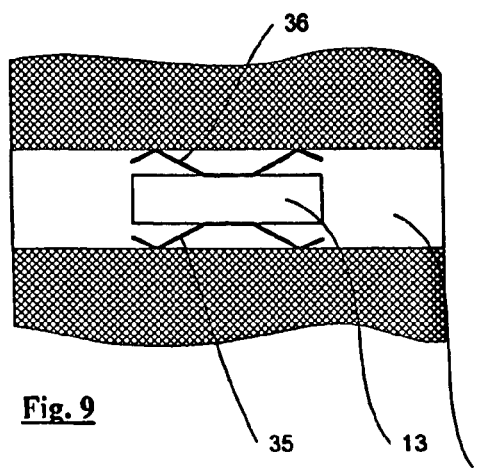
FIG. 9 is a sectional view of a pressure-conveying duct with one sensor module clamped in place in accordance with an embodiment of the inventive mechatronic device.

Sensor module (13) can be held in place by a clamping force (see FIG. 9), for example. For this purpose, it is equipped with springs (35, 36) which are braced against the inside wall of the pressure-conveying duct in which it is disposed, which can be flat or round.

Figure 10:
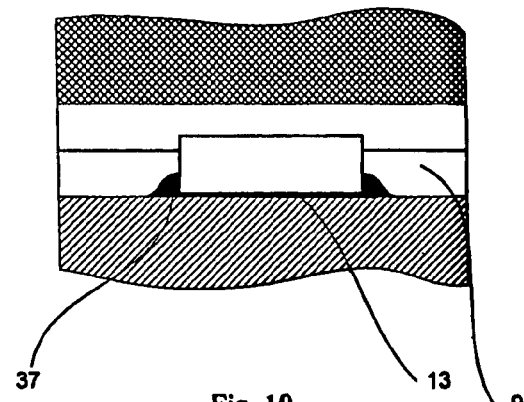
FIG. 10 is a sectional view of a pressure-conveying duct with one sensor module bonded in place in accordance with an embodiment of the inventive mechatronic device.

Sensor module (13) can also be fixed to the walls of any of pressure-conveying ducts (7, 8, 9) by means of a bonding agent (37) (see FIG. 10).

Figure 11:
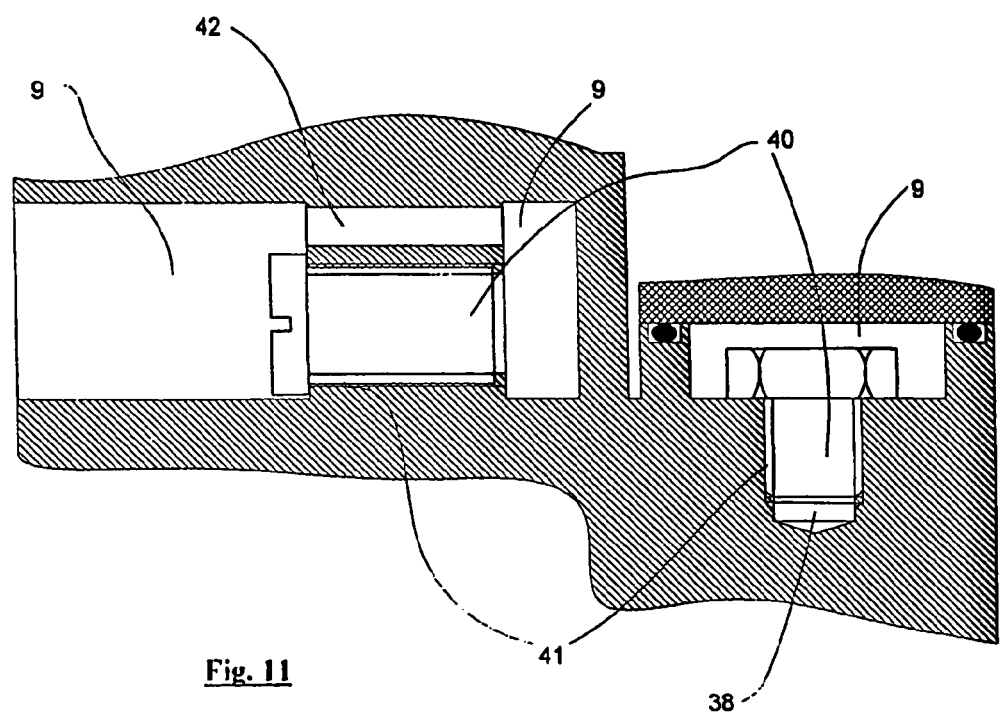
FIG. 11 is a sectional view of two pressure-conveying ducts with two sensor modules screwed into place in accordance with an embodiment of the inventive mechatronic device.

The sensor module (40 in FIG. 11) can also be provided with a cylindrical housing having an external thread (41), with which it can be screwed into a blind hole (38) extending from a pressure-conveying duct (7, 8, 9) (see FIG. 11, right).

Furthermore, it is also possible by means of external thread (41) to screw cylindrical sensor module (40) into a through bore between two pressure-conveying ducts (9) (see FIG. 11, left). In this case, the pressurized fluid is allowed to pass through by providing, for example, a passage such as a parallel bore (42).

Pressure-conveying duct (9) in FIG. 1 is formed in part by an intermediate plate (19), which is preferably made of a nonmetallic material, such as a plastic. In contrast, mechanical part (2), comprising lower part (21) with pressure-conveying duct (7) as well as pressure port (16), is preferably made of metal, such as aluminum, as is also the case with cover (20).

Nevertheless, it should be appreciated that it is also possible to make the entire mechatronic housing (1) from plastic.

Pressure-conveying ducts (7, 8, 9) can have any desired form. They can be configured as bores, cavities or even blind bores, into which there is screwed a sensor.

Electronic part (3) of housing (1) includes an electronic printed circuit board (10), which is equipped with electronic components (11). Electronic printed circuit board (10) includes a reading station (12), which according to an embodiment of the invention communicates with sensor module (13) by means of radio technology. Wireless transmission of energy or electrical data in both directions is made possible by constructing intermediate plate (19) of plastic.

To connect electronic part (3) to further electronic units, which can be mounted in a vehicle, for example, electronic printed circuit board (10) is connected by a connecting cable (18) to an electrical plug connector (17).

Figure 2:
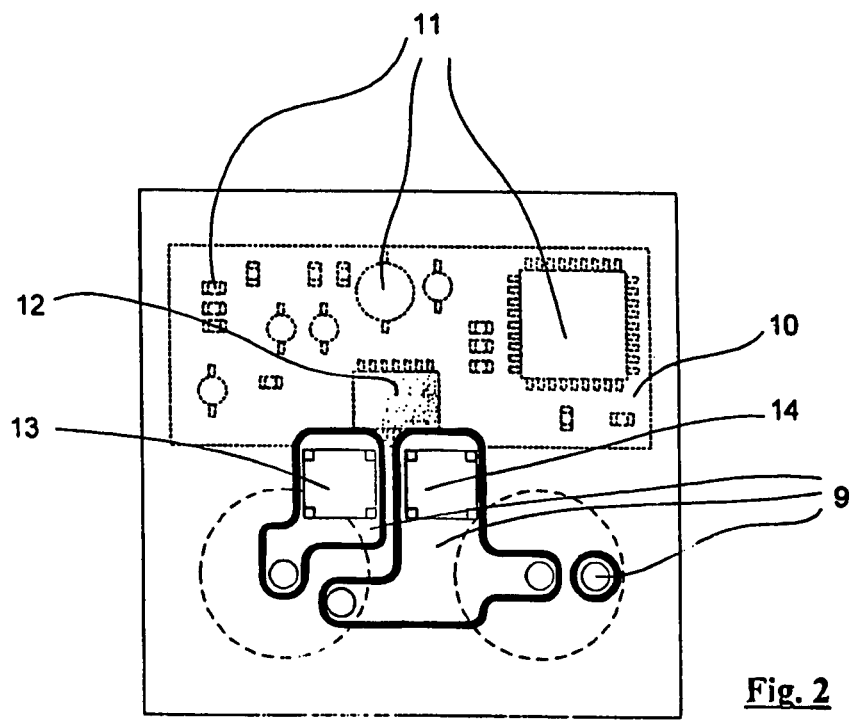
FIG. 2 is a sectional view of the embodiment of the mechatronic device depicted in FIG. 1 at the level of the electronic printed circuit board.

FIG. 2 is a sectional view through the embodiment of mechatronic housing (1) depicted in FIG. 1 at the level of electronic printed circuit board (10). Electronic components (11), including a microprocessor (28) and reading station (12), are disposed on electronic printed circuit board (10). The reading station communicates by radio technology with two sensor modules (13, 14). These are disposed in pressure-conveying ducts (9), which can be shaped differently depending on need. Pressure-conveying ducts (9) are disposed completely or partly in intermediate plate (19), which is made of insulating material (see FIG. 1).

Figure 3:
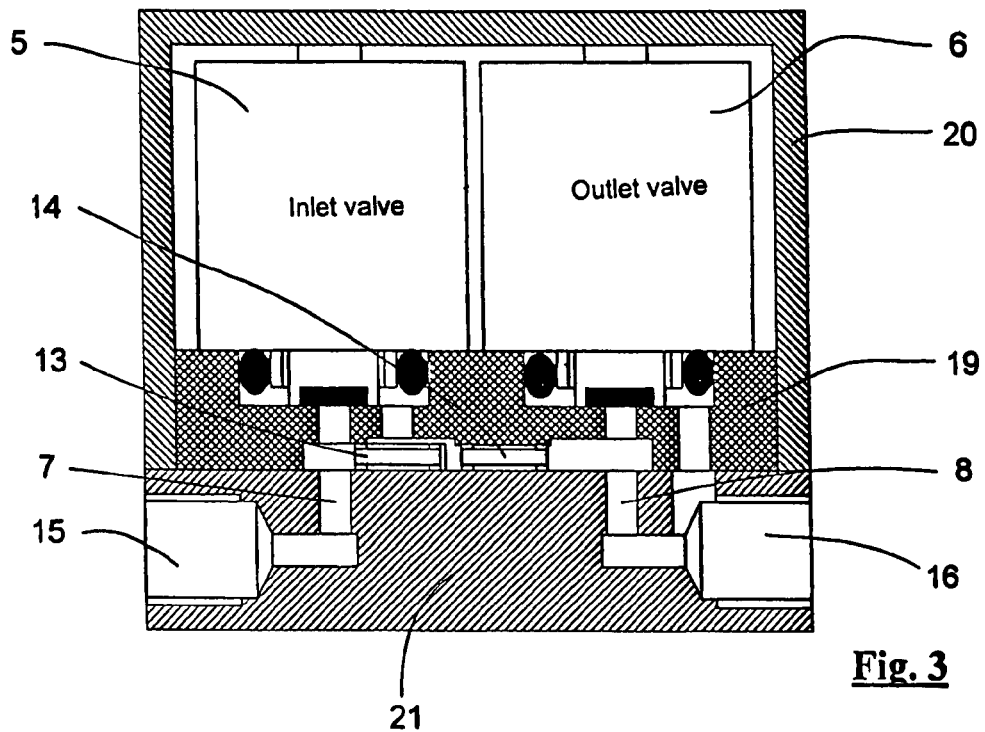
FIG. 3 is a sectional view of the embodiment of the mechatronic device depicted in FIG. 1 showing inlet and outlet valves as well as pressure ports.

FIG. 3 is another sectional view through the embodiment of mechatronic housing (1) depicted in FIG. 1 showing solenoid valves (5, 6), which operate as the inlet and outlet valves. Also depicted are sensor modules (13, 14), which in this case are disposed in the space between intermediate plate (19) and lower part (21) of mechatronic housing (1). Pressure ports (15, 16) for connecting the mechatronic device to a compressed-air system or to a hydraulic system are also depicted.

Figure 4:
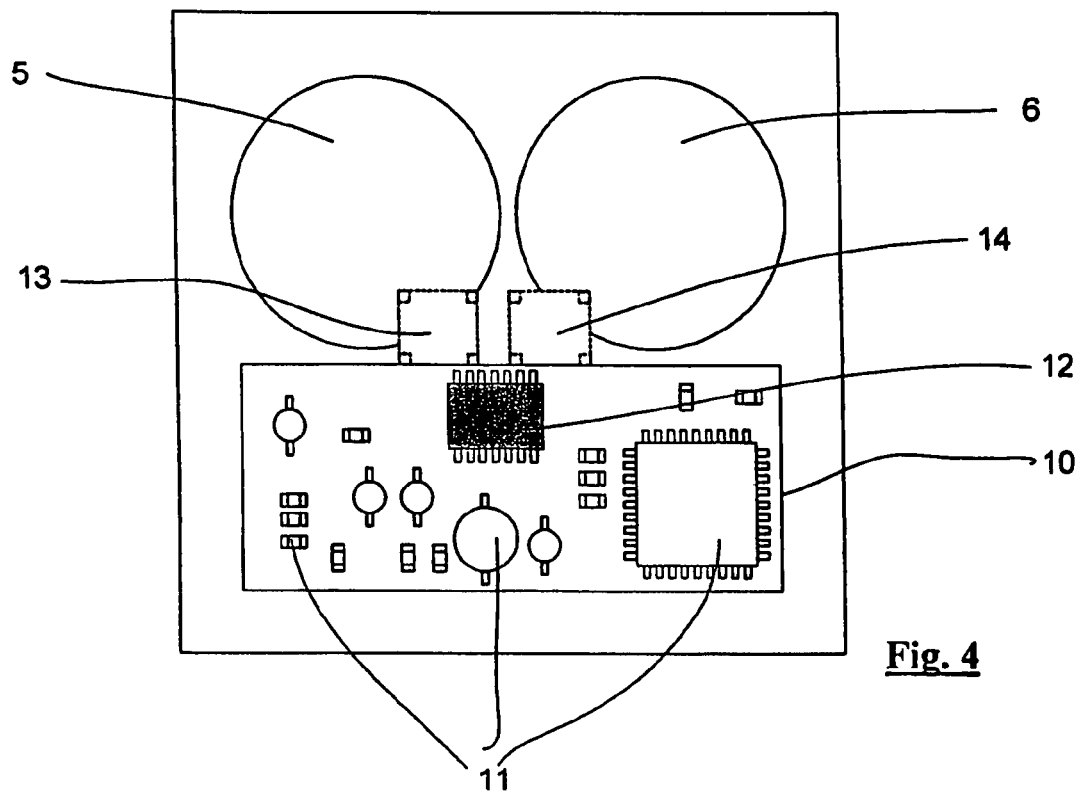
FIG. 4 is a sectional view of the embodiment of the mechatronic device depicted in FIG. 1 showing inlet and outlet valves as well as an electronic control unit.

FIG. 4 is a further sectional view through the mechatronic device at the level of electronic printed circuit board (10). Solenoid valves (5, 6) and the assembled electronic printed circuit board (10) with electronic components (11), sensor modules (13, 14) and common reading station (12) are depicted.

Figure 5:
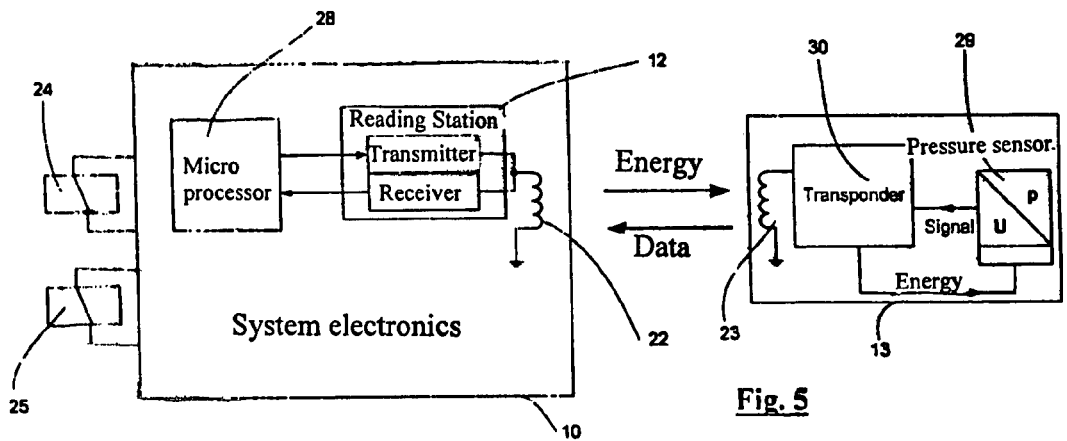
FIG. 5 is a schematic diagram illustrating energy and data transmission between the electronic control unit and the sensor module of an embodiment of the mechatronic device according to the present invention.

FIG. 5 is a schematic diagram depicting energy and data transmission between the electronic control unit or system electronics disposed on electronic printed circuit board (10) and sensor module (13).

Electronic printed circuit board (10) includes, among other components not shown, reading station (12) and microprocessor (28). Magnet windings (24, 25) of solenoid valves (5, 6) are further connected to printed circuit board (10). An antenna (22), which can be, for example, a coil printed on printed circuit board (10), is connected to reading station (12).

In accordance with an embodiment of the present invention, a transponder (30) is disposed on sensor module (13). Transponder (30) is also connected to an antenna (23), which can also take the form of a coil printed on the printed circuit board. Transponder (30) is further connected to a line that transmits energy to and another line that receives data back from pressure sensor (29). By this construction and arrangement, an ambient pressure (P) can be converted into a voltage (U), which is proportional to the pressure, and communicated to transponder (30).

In operation, when a measured value is needed, a transmission pulse is sent from reading station (12) to sensor module (13), followed by return transmission of data, in this case pressure values (as depicted by arrows between electronic printed circuit board (10) and sensor module (13) in FIG. 5). It should be understood that, depending on design, energy transmission and data transmission can also take place simultaneously.

In embodiments of the present inventions employing a plurality of sensor modules, a coded signal for identification of the responding sensor module (13) can also be transmitted back in addition to the return transmission of data.

The transmission pulse can also be coded, for example, by using different frequencies to excite the different sensor modules from which a measured value is needed.

As discussed hereinabove, pressure sensor (29) can also be part of transponder (30). The resonant frequency of the return response thus depends on the ambient pressure. In this case, there is no need for the illustrated separate transmission of energy and signal within sensor module (13).

Figure 6:
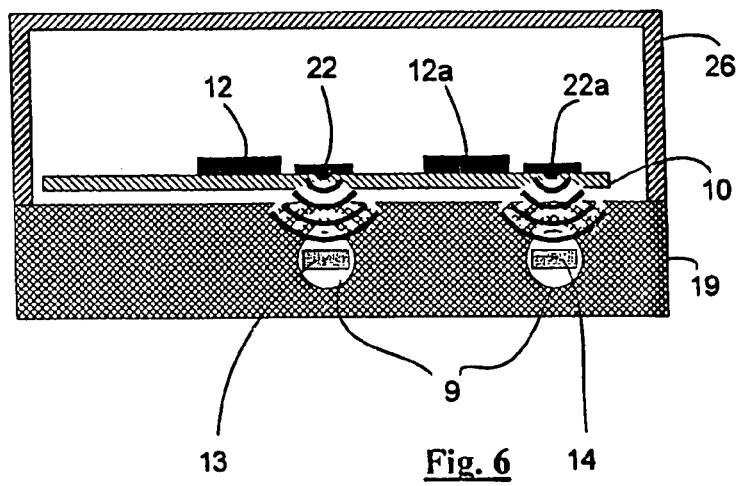
FIG. 6 is a sectional view of an electronic unit with two reading stations in combination with two sensor modules in accordance with an embodiment of the inventive mechatronic device.

FIG. 6 shows an embodiment according to the present invention whereby electronic printed circuit board (10) is mounted in a separate electronics housing (26). Two reading stations (12, 12a) are disposed on printed circuit board (10) and communicate via antennas (22, 22a) with sensor modules (13, 14). Sensor modules (13, 14) are disposed directly in pressure-conveying ducts (9), which, in this case, are tubular. An adequate cross section for flow of pressurized fluid should be provided.

Figure 7:
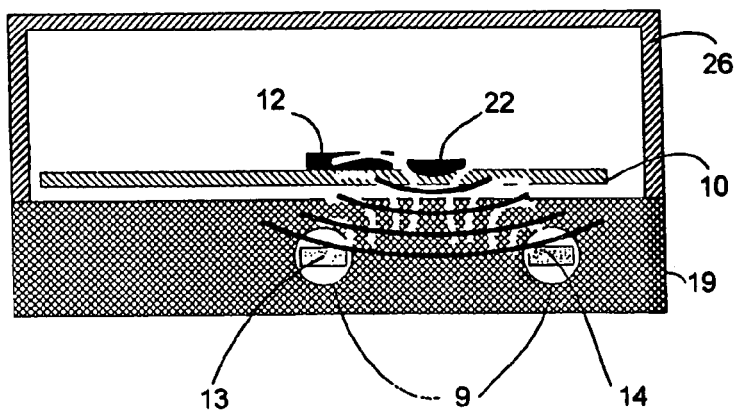
FIG. 7 is a sectional view of an electronic unit with one common reading station in combination with two sensor modules in accordance with an embodiment of the inventive mechatronic device.

As an alternative to the embodiment depicted in FIG. 6, FIG. 7 shows an embodiment of electronic printed circuit board (10) that is mounted in an electronics housing (26) but, in this case, is equipped with only a single, common reading station (12). Common reading station (12) communicates via a single antenna (22) with two sensor modules (13, 14).

To distinguish between the two sensor modules, additional transmission of corresponding codings for sensor modules (13, 14) is effected in this case. This can be achieved, for example, by using different data codes or by using different carrier frequencies for transmission of the transmission pulses as well as return transmission of the measured values.

Figure 8:
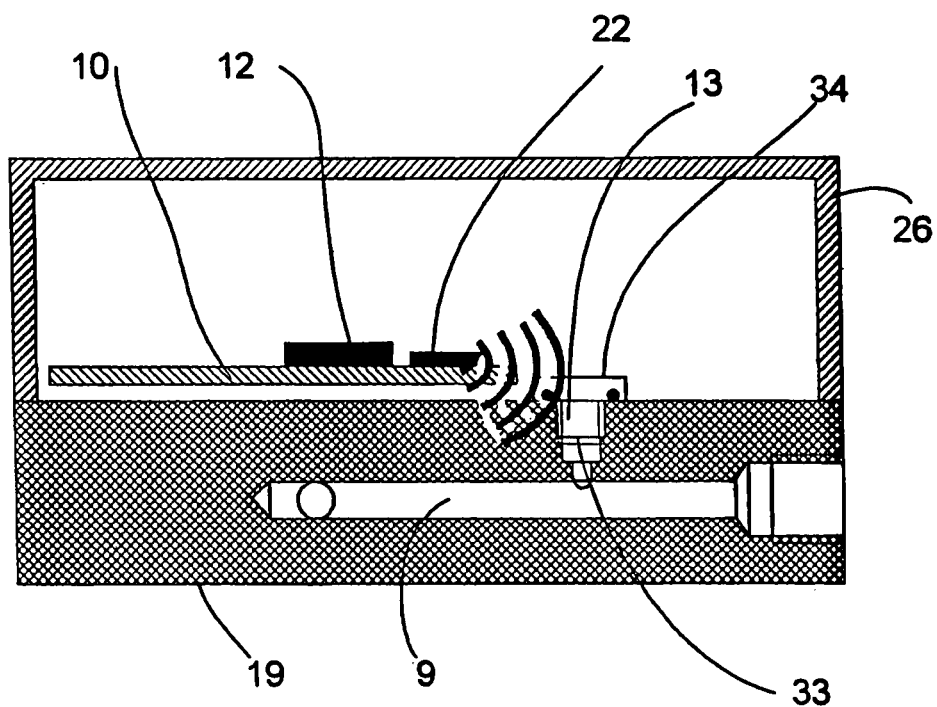
FIG. 8 is a sectional view of an electronic unit with one reading station and a sensor module located only partly in the pressure-conveying duct in accordance with an embodiment of the inventive mechatronic device.

FIG. 8 shows a further embodiment of the present invention, in which sensor module (13) is disposed only partly in pressure-conveying duct (9). In this case, a sensing part (33) of the sensor module extends into pressure-conveying duct (9), whereas a transmitting or receiving part (34) is disposed inside electronics housing (26), proximate reading station (12) with antenna (22).

This embodiment has the advantage that intermediate plate (19) does not have to be made of insulating material. However, more space is required in electronics housing (26). Moreover, the possible arrangements of pressure-conveying ducts (9), which in this case are disposed underneath electronics housing (26), are more limited. Furthermore, this embodiment calls for adequate sealing of the interface between sensor module (13) and intermediate plate (19).

Preferably, reading stations (12, 12a) and sensor modules (13, 14) are disposed in close proximity to one another. This has the advantage that the transmitting powers of reading stations (12, 12a) and of antennas (22, 22a, 23) can be low by design. Here, "close proximity" is intended to mean a distance of approximately 1 to 5 cm, depending on the size of the mechatronic device.

Besides pressures, sensor modules (13, 14) can also sense and transmit other physical variables. Examples include temperatures, mass flow rates (such as mass flows of compressed air or fluids), displacements (such as displacements of valve elements), magnetic field strengths (such as field strengths of the magnet windings of the solenoid valves) and the chemical composition of the gas or fluid flowing in the pressure-conveying ducts.

As previously indicated, the wireless radio technology used in embodiments of the present invention can be transponder technology or BLUETOOTH® technology. Both technologies have been around for some time and are standardized, and therefore are to be regarded as adequately reliable and cost-effective.

Embodiments of mechatronic devices according to the present invention which utilize data transmission by means of light will now be described.

Figure 12:
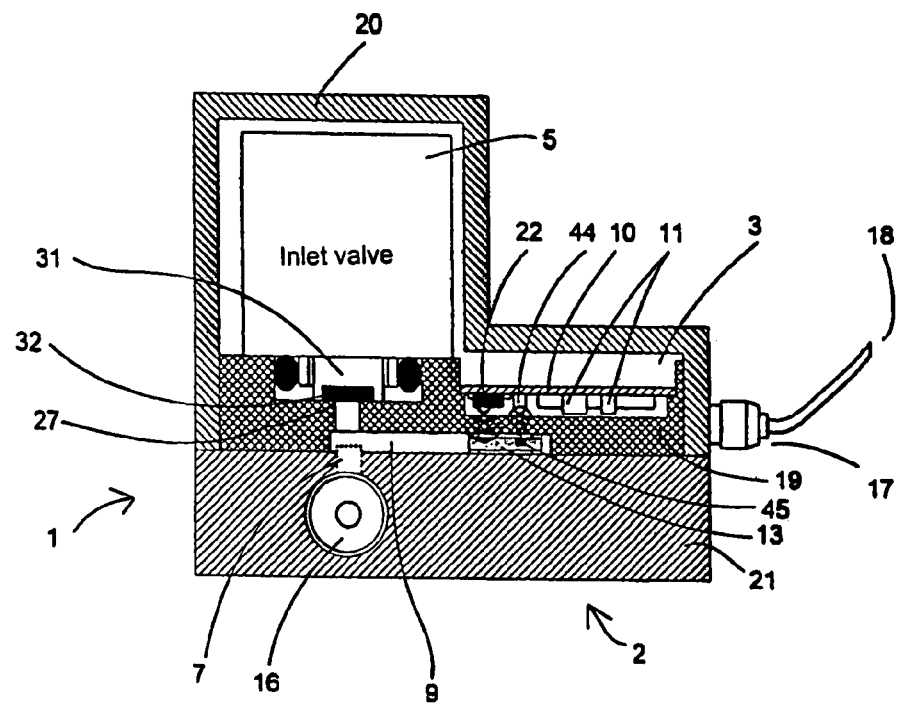
FIG. 12 depicts a mechatronic device with a solenoid valve, an electronic control unit and a sensor module installed in a pressure-conveying duct in accordance with an embodiment of the present invention.

FIG. 12 depicts one such embodiment of an inventive mechatronic device utilizing data transmission by means of light, in this case for operation of a valve array, with a housing (1) including a lower part (21) and a cover (20). The mechatronic device further includes a mechanical part (2) and an electronic part (3).

Electronic part (3) can be disposed inside the common cover (20). However, it can also be disposed in a separate electronics housing (26) (see FIG. 6), which is mounted on the mechanical part (2).

A solenoid valve pair (5, 6) is disposed under cover (20) (see FIG. 14) and includes an inlet valve (5) and an outlet valve (6). Only inlet valve (5) is shown in FIG. 12. A valve-closing element (31) is provided, which can close a valve seat (27) by means of a seal (32). As a result, a passage for compressed air or a fluid can be opened and closed.

It should be appreciated that valves other than solenoid valves can be utilized, such as, for example, piezo valves. It should also be appreciated that mechanical part (2) of the mechatronic device can include actuators and/or motors (not illustrated), which can be controlled by electronic part (3).

To provide a valve connection to external pressure lines, at least one pressure port (16) is provided, which is disposed in lower part (21) of housing (1). A pressure-conveying duct (7) is provided to connect pressure port (16) to valve seat (27).

The valve array with associated pressure-conveying ducts can be used to raise, lower or hold a pressure in a vessel. Pressure-conveying ducts (7, 8, 9) (see FIGS. 12 to 14) can have different cross-sectional shapes, for example, round or rectangular cross sections.

As shown in FIG. 12, sensor module (13) is disposed in pressure-conveying duct (9) (or it can be disposed in a cavity in communication therewith). Module (13) includes pressure sensor (29), a signal-conditioning circuit (30), light-emitting element (45), an energy-receiving coil (23) and a rectifier (50) (see FIG. 16a). Sensor module (13) is fixed by suitable means inside pressure-conveying duct (9).

Figure 20:
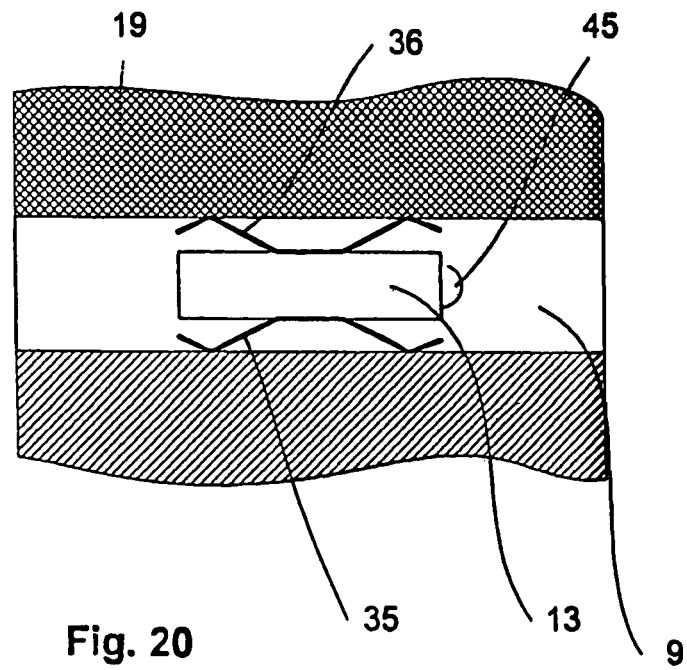
FIG. 20 is a sectional view of a pressure-conveying duct with one sensor module clamped in place in accordance with an embodiment of the inventive mechatronic device.

Sensor module (13), together with light-emitting element (45), can be held in place by a clamping force (see FIG. 20, for example. For this purpose, it is equipped with springs (35, 36), which are braced against the inside walls of the pressure-conveying duct in which it is disposed, which can be flat or round. Outward passage of light is permitted via a transparent intermediate plate (19).

Figure 21:
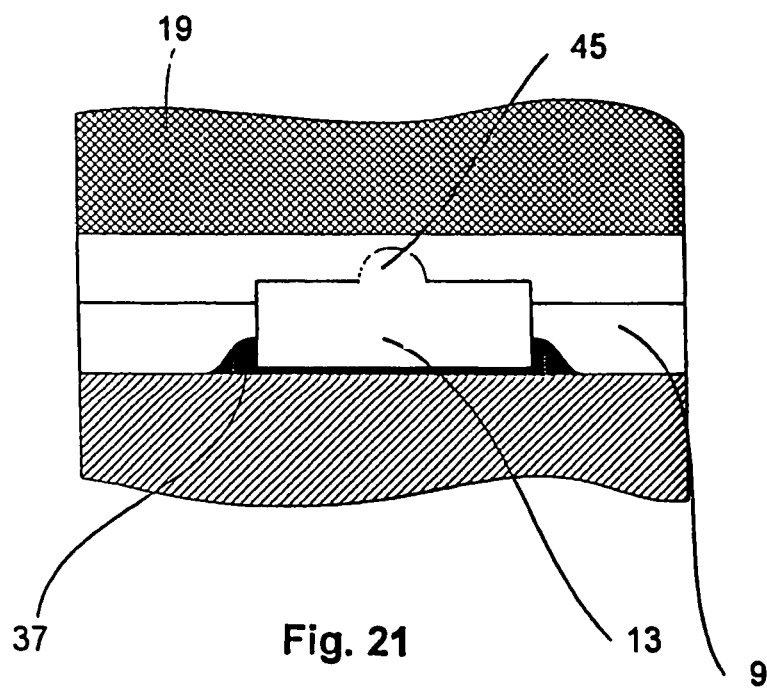
FIG. 21 is a sectional view of a pressure-conveying duct with one sensor module bonded in place in accordance with an embodiment of the inventive mechatronic device.

Sensor module (13) can also be fixed to the walls of any of pressure-conveying ducts (7, 8, 9) by means of a bonding agent (37) (see FIG. 21).

Figure 22:
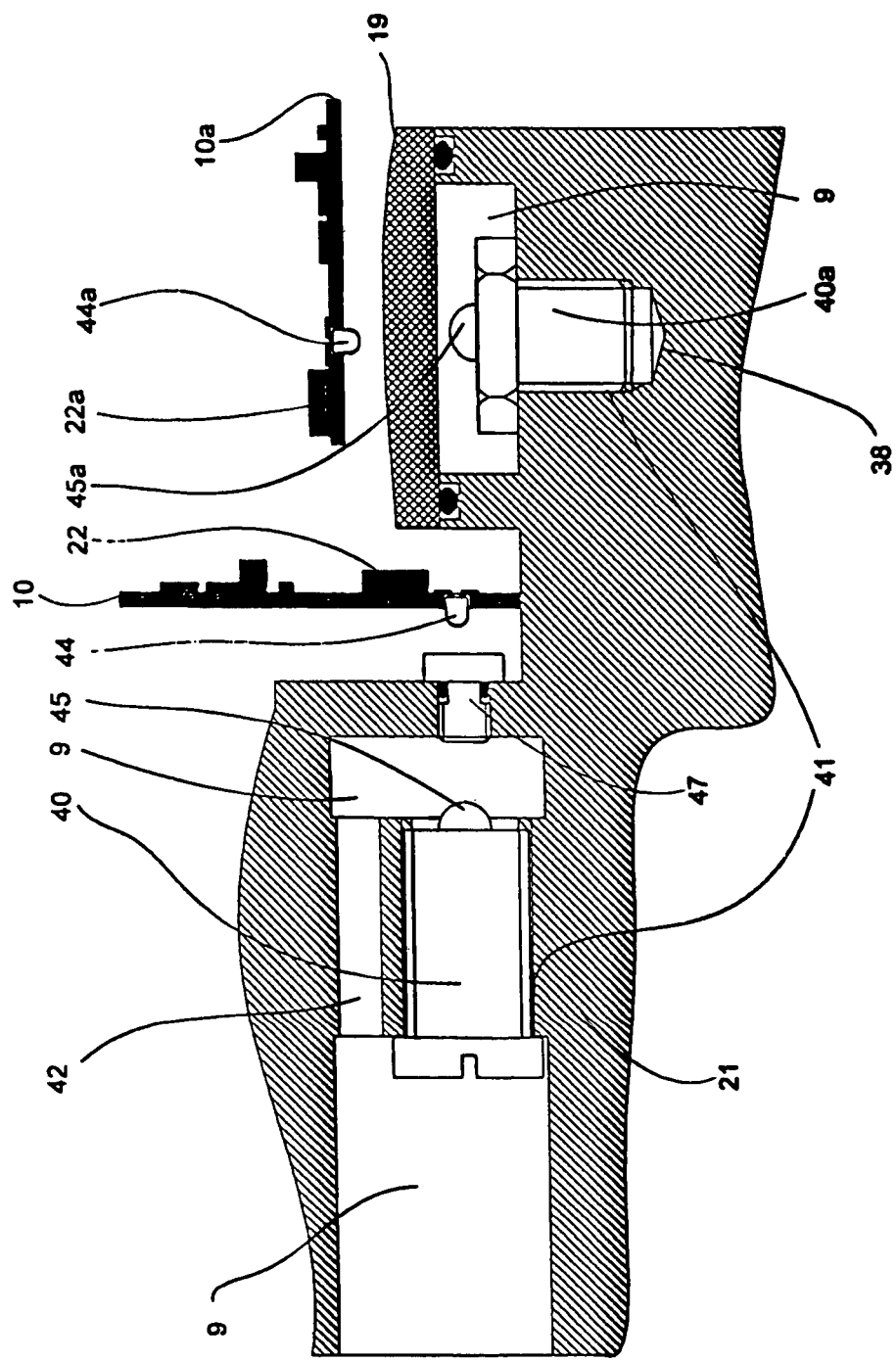
FIG. 22 is a sectional view through two pressure-conveying ducts with two sensor modules screwed into place in accordance with an embodiment of the inventive mechatronic device.

According to the embodiment shown in FIG. 22, a cylindrical sensor module (40a) can also be provided with a cylindrical housing having an external thread (41), with which it can be screwed into a blind hole (38) extending from a pressure-conveying duct (7, 8, 9) (see FIG. 22, right).

Furthermore, it is also possible by means of external thread (41) to screw cylindrical sensor module (40) into a through bore between two pressure-conveying ducts (9, 9a) (see FIG. 22, left). In this case, the pressurized fluid is allowed to pass through by providing, for example, a passage such as parallel bore (42).

FIG. 22 further depicts two electronic printed circuit boards (10, 10a), which are equipped with light-sensitive elements (44, 44a). Light-sensitive elements (44, 44a) receive data from two light-emitting elements (45, 45a) of sensor modules (40, 40a).

Data transmission by (left) sensor module (40) takes place via an IR-transparent element (47), which can be screwed in pressure-tight manner into light-impermeable lower part (21). Data transmission by (right) sensor module (40a) takes place via an IR-transparent intermediate plate (19).

Pressure-conveying duct (9) in FIG. 12 is formed in part by an intermediate plate (19), which is preferably made of a nonmetallic material, such as a plastic. At least part of intermediate plate (19) comprises IR-transparent material. In contrast, mechanical part (2), comprising lower part (21) with pressure-conveying ducts (7, 9) as well as pressure port (16), are preferably made of metal, such as aluminum, as is also the case with cover (20).

Nevertheless, as previously indicated, it should be appreciated that it is also possible to make the entire mechatronic housing (1) from plastic. Also, pressure-conveying ducts (7, 8, 9) can have any desired form. They can be configured as bores, cavities of any desired form or even blind bores, into which there is screwed a sensor.

According to FIG. 12, electronic part (3) of housing (1) includes electronic printed circuit board (system electronics) (10), which is equipped with electronic components (11). Electronic printed circuit board (10) also includes light-sensitive element (44), which can receive data wirelessly by means of IR light from light-emitting element (45) mounted on sensor module (13) (see FIGS. 16a to 16c).

Electronic printed circuit board (10) further includes a transmitting coil (22) for supplying sensor module (13) with electrical energy. For this purpose, sensor module (13) includes a receiving coil (23) (see FIG. 16a).

Wireless transmission of electrical data by means of IR light is achieved by constructing intermediate plate (19) at least partly of transparent plastic. Also, separate, light-guiding parts (47) can be inserted to penetrate through light-impermeable lower part (21) of the housing (see FIG. 22).

To connect electronic part (3) to further electronic units, which can be mounted in a vehicle, for example, electronic printed circuit board (10) is connected by connecting cable (18) to electrical plug connector (17).

Figure 13:
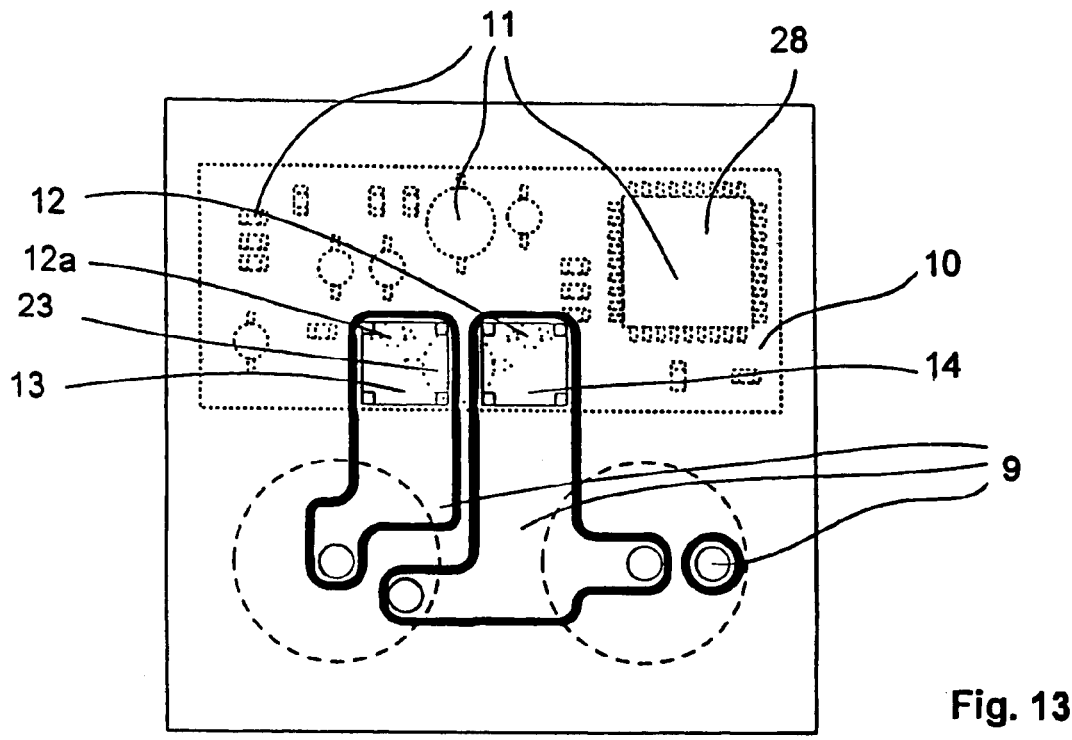
FIG. 13 is a sectional view of the mechatronic device depicted in FIG. 12 at the level of the electronic printed circuit board.

FIG. 13 is a sectional view through the embodiment of mechatronic housing (1) depicted in FIG. 12 at the level of electronic printed circuit board (10). Electronic components (11), including microprocessor (28) and two reading stations (12, 12a), are disposed on electronic printed circuit board (10). The reading stations communicate wirelessly with two sensor modules (13, 14). These are disposed in pressure-conveying ducts (9), which can be shaped differently depending on need. Pressure-conveying ducts (9) are disposed completely or partly in intermediate plate (19), which is made at least partly of transparent insulating material (see FIG. 12).

Figure 16A:
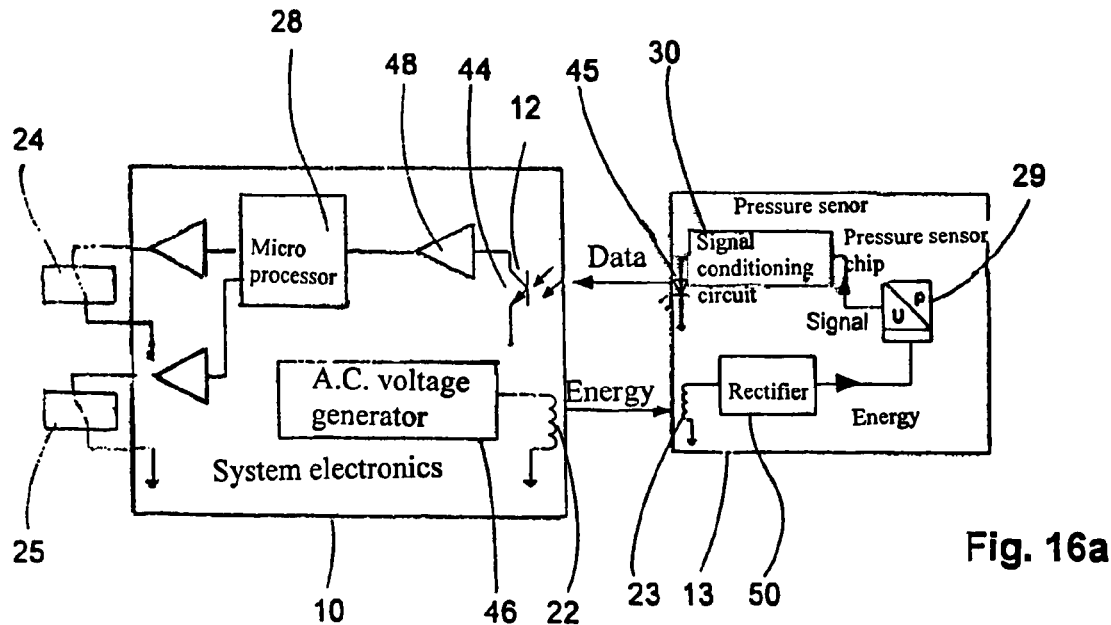
FIG. 16a is a schematic diagram illustrating energy and data transmission between the electronic control unit and a pressure sensor module of an embodiment of the mechatronic device according to the present invention.
Figure 16B:
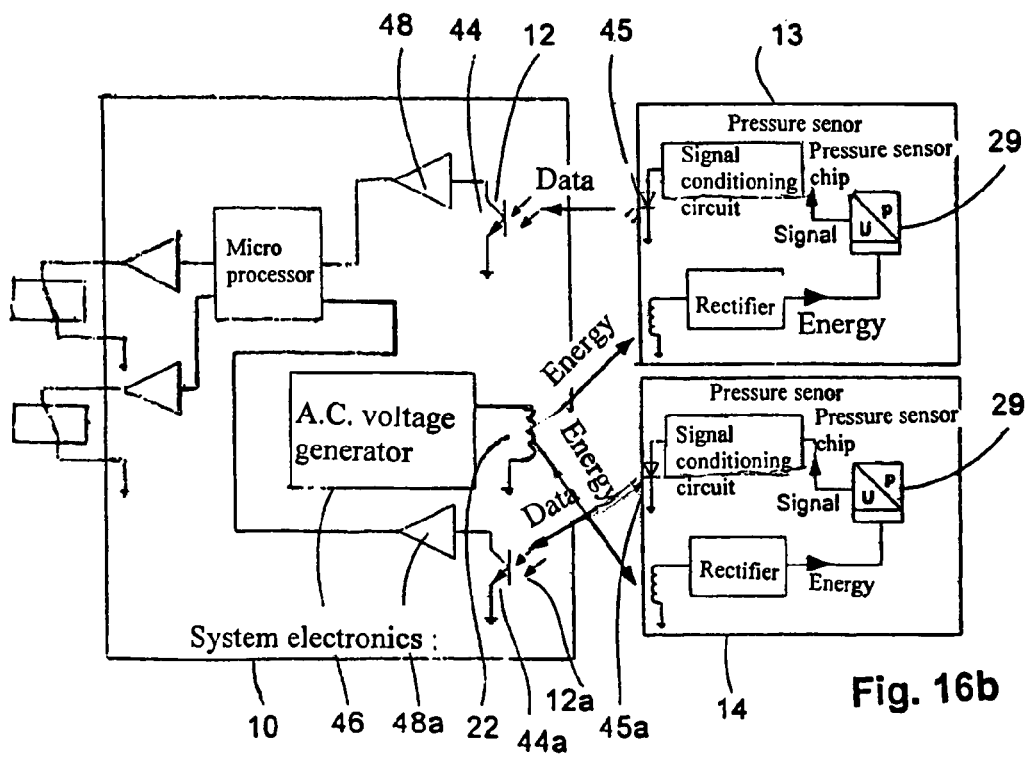
FIG. 16b is a schematic diagram illustrating energy and data transmission between the electronic control unit and two pressure sensor modules with two reading stations of an embodiment of the mechatronic device according to the present invention.

The unit comprising light-sensitive element (44, 44*a*) and amplifiers (48, 48*a*) is designated as reading station (12, 12*a*) (see FIG. 16*b*). In some cases, amplifiers (48, 48*a*) may not even be necessary.

Figure 14:
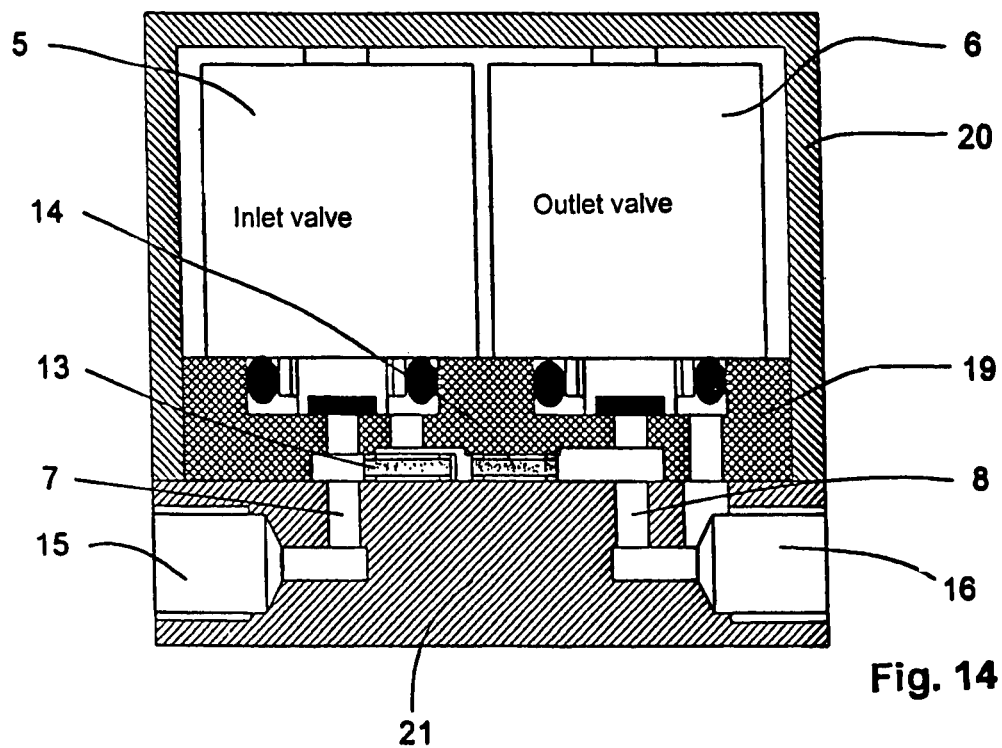
FIG. 14 is a sectional view of the mechatronic device depicted in FIG. 12 showing inlet and outlet valves as well as pressure ports.

FIG. 14 is another sectional view through the embodiment of mechatronic housing (1) depicted in FIG. 12. Solenoid valves (5, 6) operate as the inlet and the outlet valves. Also depicted are two sensor modules (13, 14), which in this case are disposed between intermediate plate (19) and lower part (21) of mechatronic housing (1). Pressure ports (15, 16) for connecting the mechatronic device to a compressed-air system or to a hydraulic system are also shown.

Figure 15:
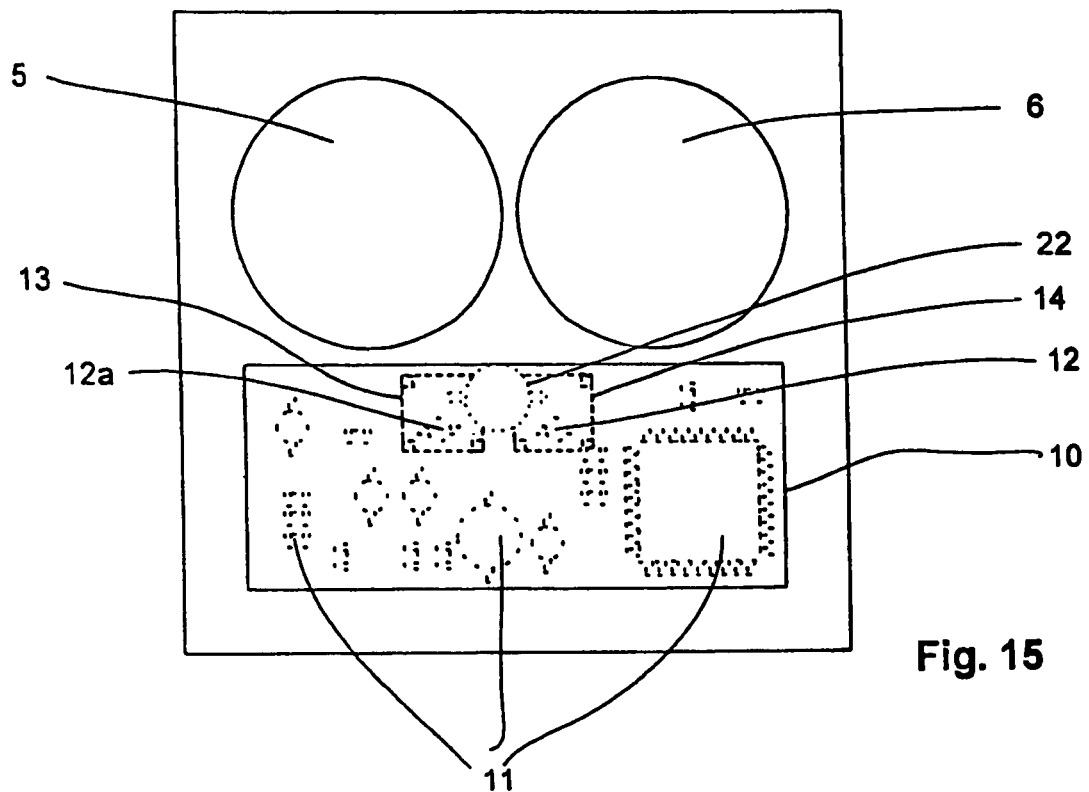
FIG. 15 is a sectional view of the mechatronic device depicted in FIG. 12 showing inlet and outlet valves as well as an electronic control unit.

FIG. 15 is a further sectional view through the mechatronic device at the level of electronic printed circuit board (10). Solenoid valves (5, 6), the assembled printed circuit board (10) with electronic components (11), sensor modules (13, 14) and neighboring common reading station (12, 12*a*) associated therewith are shown. A common energy-transmitting coil (22) is also disposed on printed circuit board (10).

Figure 16C:
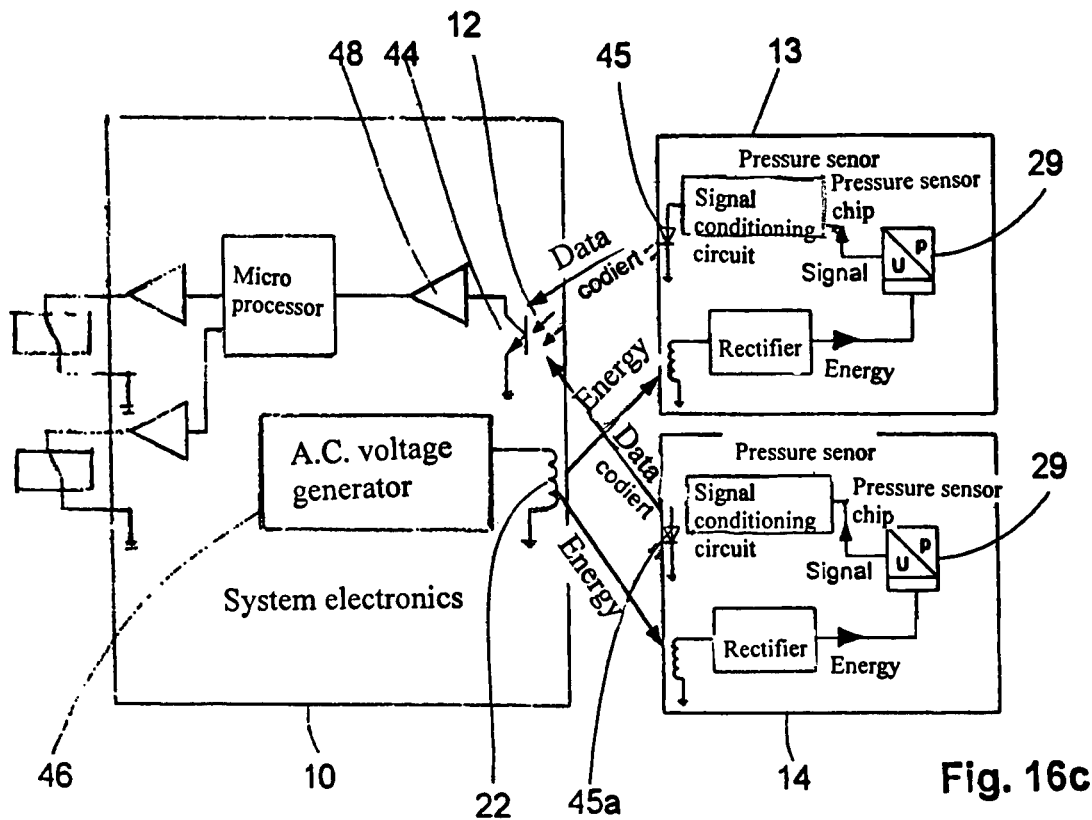
FIG. 16c is a schematic diagram illustrating energy and data transmission between the electronic control unit and two pressure sensor modules with one common reading station of an embodiment of the mechatronic device according to the present invention.

FIGS. 16*a* to 16*c* illustrate energy and data transmission between the electronic control unit or system electronics disposed on electronic printed circuit board (10) and sensor modules (13, 14).

Electronic printed circuit board (system electronics) (10) in FIG. 16*a* includes, among other elements not shown, reading station (12) with a light-sensitive element (44), in this embodiment a phototransistor, and microprocessor (28). Magnet windings (24, 25) of solenoid valves (5, 6) are further connected to printed circuit board (10). For energy transmission, transmitting coil (22), which can be, for example, a coil printed on printed circuit board (10), is connected to an alternating current ("AC") voltage generator (46).

Pressure sensor (29) is disposed on associated sensor module (13) and can feed an output signal to a signal-conditioning circuit (30). To this there is connected, for data transmission to reading station (12), light-emitting element (45), in this case an IR LED.

Receiving coil (23) is used to supply energy to pressure sensor (29). Receiving coil (23), can be configured as a coil printed on a printed circuit board, and can receive its energy inductively from transmitting coil (22). Rectifier (50) is connected to receiving coil (23). For temporary energy storage, a capacitor or a battery (accumulator) (not illustrated) can be included in rectifier (50).

In operation, when a measured value is needed, a transmission pulse is sent from voltage generator (46) to sensor module (13), followed by return transmission of data, in this case pressure values, via light-emitting element (45) (as depicted by arrows between electronic printed circuit board (10) and sensor module (13)). It should be understood that, depending on the design of sensor module (13), energy transmission and return transmission of data can also take place simultaneously.

In the embodiment shown in FIG. 16*b*, signals are transmitted from two sensor modules (13, 14) to electronic printed circuit board (system electronics) (10). The energy supply for both modules is provided via a common AC voltage generator (46) with common transmitting coil (22). Common energy transmission is preferable when the sensor modules to be supplied are not disposed too far away. Return transmission of data takes place separately for each sensor module, to two reading stations (12, 12*a*), each with a light-sensitive element (44, 44*a*).

As illustrated in FIG. 16*c*, not only the actual pressure data but also coded signals for identification of responding sensor modules (13, 14) can be transmitted back during return data transmission in the case of two light-emitting elements (45, 45*a*). In this embodiment, only one common reading station (12) with only one light-sensitive element (44) is needed on electronic printed circuit board (system electronics) (10). Energy transmission to sensor modules (13, 14) takes place by means of a common AC voltage generator (46) with common transmitting coil (22).

It is also possible to code the energy-transmission pulse, for example, by using different frequencies of voltage generator (46). As a result, the different sensor modules from which a measured value is needed can be excited separately, thus saving energy.

Figure 17:
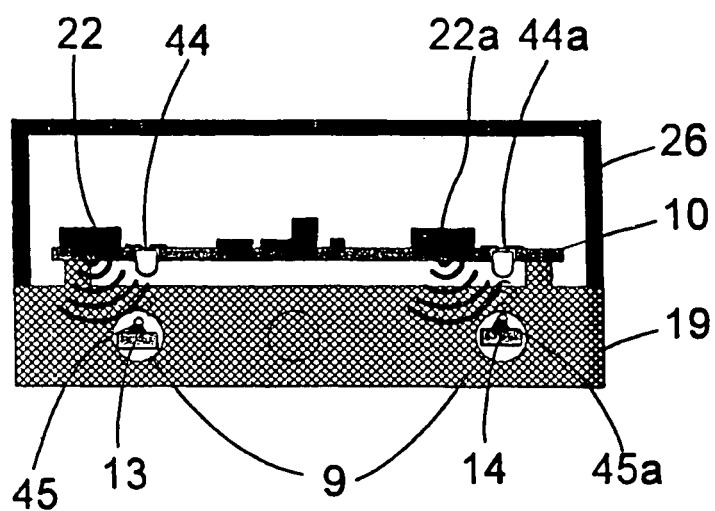
FIG. 17 is a sectional view of an electronic unit with two reading stations in combination with two sensor modules in accordance with an embodiment of the inventive mechatronic device.

FIG. 17 depicts an embodiment of the present invention including two circuits of the same type as in FIG. 16*a*. Electronic printed circuit board (system electronics) (10), in this case, is mounted in a separate electronics housing (26). Two transmitting coils (22, 22*a*), which transmit energy to two sensor modules (13, 14), are disposed on electronic printed circuit board (10). The use of separate energy-transmitting coils is preferred when the modules to be supplied are disposed relatively far away from one another.

Printed circuit board (10) further includes two light-sensitive elements (44, 44*a*), which receive data from sensor modules (13, 14). Sensor modules (13, 14) are disposed directly in pressure-conveying ducts (9), which, in this embodiment, are tubular. An adequate cross section for flow of pressurized fluid should be provided.

Return transmission of data takes place via IR-emitting elements (45, 45*a*) of sensor modules (13, 14) to light-sensitive elements (44, 44*a*).

In order to enable light reception, printed circuit board (10) is provided with perforations or bores in the region of light-sensitive elements (44, 44*a*), and light-sensitive elements (44, 44*a*) are inserted downward therethrough. Intermediate plate (19) is made of IR-transparent material.

Figure 18:
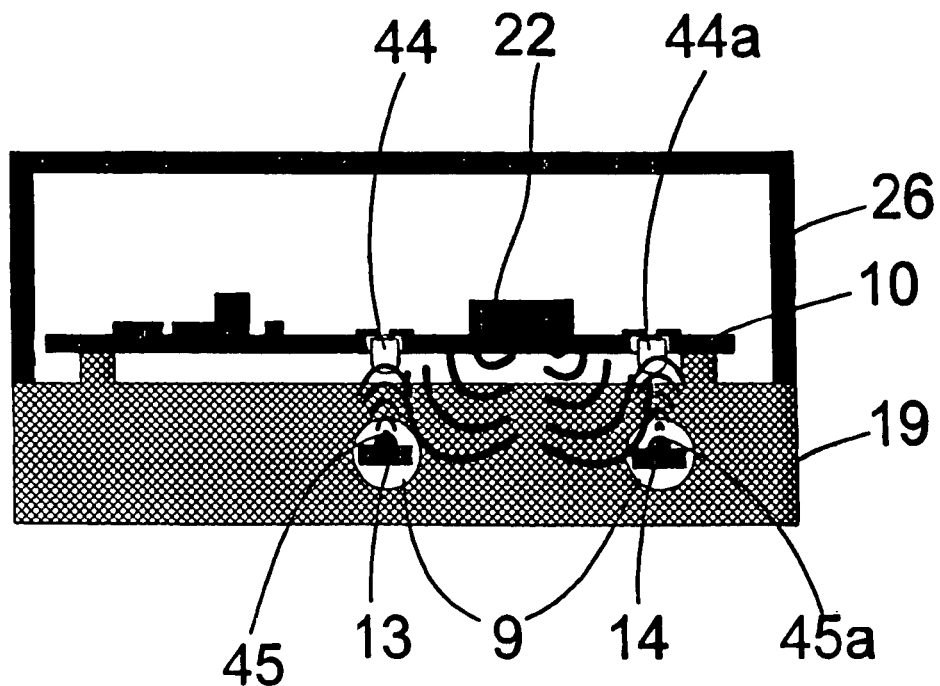
FIG. 18 is a sectional view of an electronic unit with two reading stations in combination with two sensor modules in accordance with an embodiment of the inventive mechatronic device.

FIG. 18 corresponds to the circuit of FIG. 16*b*. As with FIG. 17, it is a sectional view of an electronic printed circuit board (10) that is mounted in an electronics housing (26). However, the embodiment shown in FIG. 18 is equipped with only a single, common energy-transmitting coil (22). Via single transmitting coil (22), energy is supplied on demand or continuously to two sensor modules (13, 14). If, temporarily, no sensor data are needed, the energy transmission can be stopped in order to save energy. Data transmission takes place via light-emitting elements (45, 45*a*) to two light-sensitive elements (44, 44*a*).

To distinguish between the return responses of the two sensor modules (13, 14), additional transmission of corresponding codings of the output signals of sensor modules (13, 14) is desirable. This can be achieved, for example, by using different data codes during return transmission of the measured values.

Figure 19:
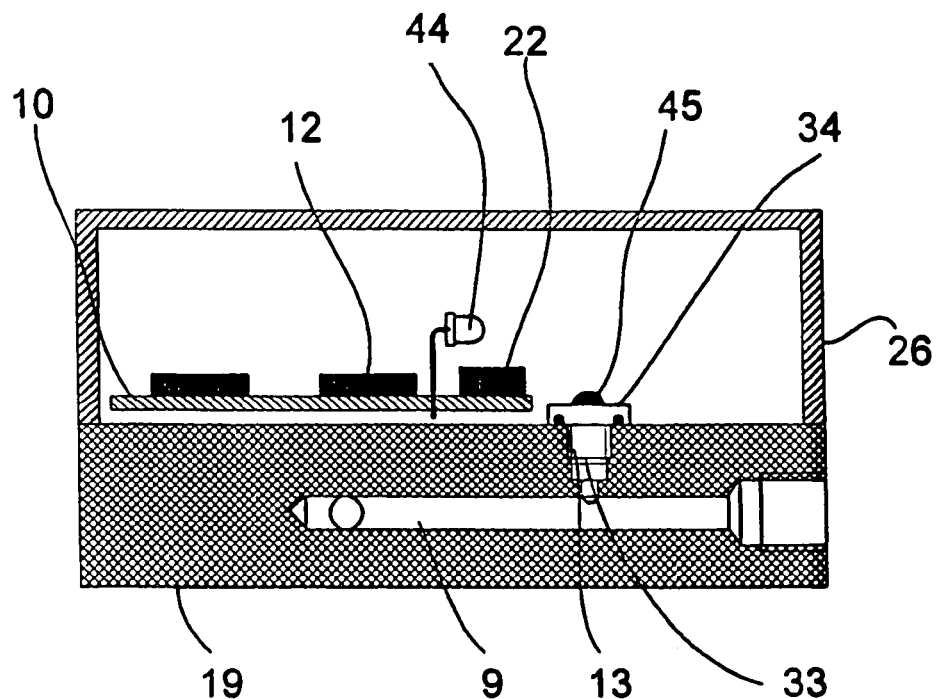
FIG. 19 is a sectional view of an electronic unit with one reading station and a sensor module located only partly in the pressure-conveying duct in accordance with an embodiment of the inventive mechatronic device.

FIG. 19 depicts a further embodiment of the present invention in which sensor module (13) is disposed only partly in pressure-conveying duct (9). In this case, sensing part (33) of sensor module (13) extends into pressure-conveying duct (9), whereas transmitting or receiving part (34) is disposed inside electronics housing (26) proximate reading station (12) with transmitting coil (22). Data transmission of the measured value takes place from light-emitting element (45) of sensor module (13) to light-sensitive element (44) connected to reading station (12).

This embodiment has the advantage that intermediate plate (19) does not have to be made of IR-transparent insulating material. However, more space is needed in electronics housing (26). Moreover, the possible arrangements of pressure-conveying ducts (9), which in this case are disposed directly underneath electronics housing (26), are more limited. Furthermore, this embodiment calls for adequate pressure-tight sealing of the interface between sensor module (13) and intermediate plate (19).

Preferably, reading stations (12, 12a) and sensor modules (13, 14) are disposed in close proximity to one another (e.g., a distance of approximately 1 to 5 cm, depending on the size of the mechatronic device). This has the advantage that the transmitting powers of AC voltage generators (46) for energy transmission and of energy transmitting and receiving coils (22, 23) can be low by design.

As previously indicated, sensor modules (13, 14) can also sense and transmit other physical variables (e.g., temperatures, mass flow rates (such as mass flows of compressed air or fluids), displacements (such as displacements of valve elements), magnetic field strengths (such as field strengths of the magnet windings of the solenoid valves) and the chemical composition of the gas or fluid flowing in the pressure-conveying ducts).

For pressure measurement, it is possible, depending on need, to use absolute-value sensors or even differential-pressure sensors. Differential-pressure sensors can detect the pressure difference between a pressure-conveying duct (9) and the interior of an electronic housing (26), especially in the configuration according to the embodiment of the present invention depicted in FIG. 19. In contrast, pressure sensors mounted completely in pressure-conveying ducts are designed as absolute-value pressure sensors.

The use of any desired number of sensors within a mechatronic device is possible, and the advantages of the data-transmission approach according to embodiments of the present invention as described hereinabove become more prominent as the number of sensors integrated increases.

Apart from improved interference immunity, another advantage of data transmission with LEDs compared with the use of transponders, which is also possible, is the improved transmission dynamics. That is, a measured value can be made available more rapidly.

Preferably, IR LEDs are used as light-emitting elements. These LEDs have been around for some time and are standardized, and therefore are to be regarded as adequately reliable and cost-effective. Data transmission by means of IR LEDs is also known and proven to those of ordinary skill in the art, for example from remote control of television receivers.

Compared with other LEDs that emit in the visible region, IR LEDs have the advantage that reliable data transmission is assured even if the inside faces of pressure-conveying ducts (9) are dirty.

Instead of IR LEDs, it is also possible to use laser diodes, especially when the transmission distance is relatively long. Other examples of light-sensitive elements that can be used are phototransistors and photodiodes.

It will thus be seen that the objects set forth above, among those made apparent from the preceding description, are efficiently attained, and since certain changes may be made in the above constructions without departing from the spirit and scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A mechatronic device comprising:
a housing;
a mechanical part located in the housing, the mechanical part including:
at least one solenoid valve; and
at least one pressure-conveying duct coupled to the at least one solenoid valve;
an electrical part including a printed circuit board; and
a plurality of sensors operable to measure at least one physical characteristic of the at least one pressure conveying duct, wherein the plurality of sensors:
is mounted entirely in the pressure conveying duct;
communicates wirelessly with at least one reading station of the printed circuit board, wherein the space between said the plurality of sensors and the at least one reading station is transparent to wireless communication, and wherein the at least one reading station is configured to distinguish between individual sensors of the plurality of sensors based on a characteristic of the wireless communication.

2. The mechatronic device of claim 1, wherein the electrical part is located in at least one of a chamber of the housing and a separate electronic housing coupled to the housing.

3. The mechatronic device of claim 1, wherein the characteristic of the wireless communication is the carrier frequency of the wireless communication.

4. The mechatronic device of claim 1, wherein the wireless communication comprises light.

5. The mechatronic device of claim 1, wherein the wireless communication comprises IR light.

6. The mechatronic device according to claim 1, wherein said at least one physical characteristic includes at least one of pressure, temperature, mass flow rate, displacement, magnetic field strength and chemical composition.

7. The mechatronic device according to claim 1, wherein said mechanical part is at least partly formed from plastic.

8. The mechatronic device according to claim 1, further comprising an intermediate plastic plate mounted between said electronic part and said mechanical part.

9. The mechatronic device according to claim 8, wherein said at least one pressure-conveying duct is formed at least one of completely and partly through said intermediate plate.

10. The mechatronic device according to claim 1, wherein the plurality of sensors is disposed proximate said to the at least one reading station.

11. The mechatronic device according to claim 1, wherein each of the plurality of sensors communicates with a common one of said at least one reading station.

12. The mechatronic device according to claim 1, wherein the characteristic of the wireless communication comprises coded data.

13. The mechatronic device according to claim 1, wherein said at least one sensor module is inserted into said at least one pressure-conveying duct and held in position therein by a clamping force.

14. The mechatronic device according to claim 13, wherein said clamping force is generated by at least one spring braced against at least one inside wall of said at least one pressure-conveying duct.

15. The mechatronic device according to claim 1, wherein the plurality of sensors is constructed and arranged to communicate with said at least one reading station by radio signals.

16. The mechatronic device according to claim 15, wherein said radio signals are one of transponder signals and Bluetooth signals.

* * * * *

UNITED STATES PATENT AND TRADEMARK OFFICE
CERTIFICATE OF CORRECTION

PATENT NO. : 8,413,678 B2
APPLICATION NO. : 11/666057
DATED : April 9, 2013
INVENTOR(S) : Andreas Teichmann and Karl Ahrens It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 766 days.

In the Claims:

Claim 1, in column 12, line 26 should be corrected as follows:

between "said" the plurality of sensors and the at least

Claim 10, in column 12, line 56 should be corrected as follows:

the plurality of sensors is disposed proximate "said" to the at

Signed and Sealed this
Twenty-fifth Day of June, 2013

Teresa Stanek Rea
*Acting Director of the United States Patent and Trademark Office*

UNITED STATES PATENT AND TRADEMARK OFFICE
CERTIFICATE OF CORRECTION

PATENT NO. : 8,413,678 B2
APPLICATION NO. : 11/666057
DATED : April 9, 2013
INVENTOR(S) : Teichmann et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 946 days.

Signed and Sealed this
First Day of September, 2015

Michelle K. Lee
*Director of the United States Patent and Trademark Office*